United States Patent Office 2,850,721
Patented Sept. 2, 1958

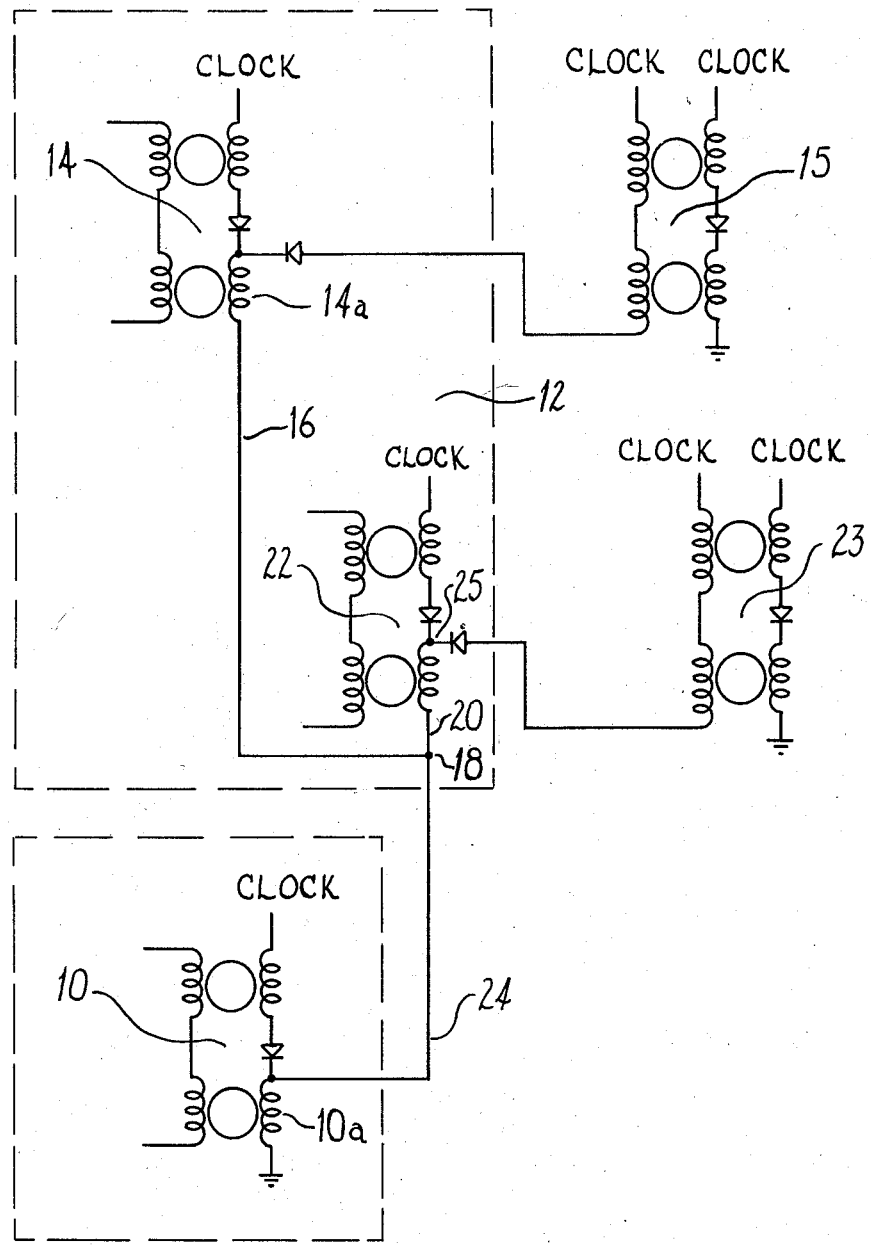

2,850,721

GROUND RETURN CONTROL

Robert O. Gunderson, St. Paul, and John D. Goodell, Minneapolis, Minn., assignors, by mesne assignments, to Librascope, Incorporated, a corporation of California Application February 7, 1955, Serial No. 486,532

8 Claims. (Cl. 340—174)

This invention relates to magnetic elements used as components in digital binary computing systems.

In the copending application of Robert O. Gunderson for "Push-Pull Magnetic Element" there is described a magnetic element composed of two magnetic cores having series connected clock output and clock reset windings thereon. It is also shown how these elements can be connected together in combinations to produce logical functors. The co-pending application of Robert O. Gunderson was filed on February 2, 1955, and was given Serial Number 485,668.

The objects of the instant invention are to connect such magnetic elements to each other so that the output of a controlled element will always be 1 if the control signal applied by the control element is 1, and if the signal applied by the control element is 0, then the output of the controlled elements will be determined by the logical character of the controlled elements and the information signals applied to the input lines of the controlled elements.

In general, these objects are obtained by connecting the output line of a control element to the ground return path of the clock output winding of a controlled element. Thus, when the control element is generating an output 1, it will cancel the output of the controlled element.

The means by which the objects of the invention are obtained are described more fully with respect to the accompanying circuit diagram.

In the diagram the control element 10 is indicated in a box and the controlled elements in the box 12. The controlled element 14 has its clock output line 16 terminated at 18. The clock output line 20 of controlled element 22 is likewise terminated at 18.

A control element 10 has its output line 24 also terminated at 18.

Element 14 drives element 15, and element 22 drives element 23. However, element 14 is controlled by element 10.

In this circuit the usual convention of a 1 and a 0 is reversed. Here the absence of a pulse or a signal is assumed to be a 1, and the presence of a pulse a 0.

Assuming that point 18 is at ground potential, if winding 14a is at low impedance, current will flow from element 15 to element 14, through winding 14a and to point 18. The same occurs for elements 23 and 22. Thus current flow in element 15 has effected a 0 therein, and in this sense the element 15 is a driven element.

If 14a is at high impedance, then no current can flow in element 15, and the absence of a pulse effects a 1 in element 15.

When winding 10a of element 10 is at high impedance, no current can flow etiher from element 15 to point 18, or from element 23 through points 25 and 18 because the potential of point 18 has been raised by the clock of element 10. The effect of this is that a 1 is placed in both of elements 15 and 23, regardless of the output of elements 14 and 22. Thus elements 14 and 22 have been controlled by element 10, and the signal in the element driven by the controlled element is a 1 when the control signal is a 1, and whatever is determined by the controlled elements when the control signal is 0.

One of the principal advantages of this circuitry is in that it permits the control of a relatively large number of elements without drawing significant powers from the control source.

Having now described the means by which the objects of the invention are obtained, we claim:

1. In combination, a control member having first and second cores each saturable with fluxes of opposite polarities, first and second windings disposed on the core, means for providing for the introduction of input signals for saturating the cores with fluxes of particular polarities, means including the windings for providing for the introduction of clock signals to the windings to provide a particular impedance in the second winding in accordance with the prior introduction or lack of introduction of the input signals to the cores, first and second controlled members each having first and second saturable cores and each having first and second windings disposed on the cores and connected in a relationship corresponding to that provided for the first and second windings on the control member, a first circuit including a first impedance means and the second windings on the control member and the first controlled member for providing for the introduction of the clock pulses to the second windings to produce output pulses in the first impedance means upon the occurrence of the particular impedance in at least one of the windings in the circuit, and a second circuit including a second impedance means and the second windings on the control member and the second controlled member for providing for the introduction of the clock pulses to the windings to produce output pulses in the second impedance means upon the occurrence of the particular impedance in at least one of the windings in the circuit.

2. In combination, a control member including first and second cores each saturable with fluxes of opposite polarities, first unidirectional means, first and second windings disposed on the first and second cores, each of the cores being adapted to provide a low impedance to the windings on the cores upon the occurrence of saturating flux of a particular polarity in the core and upon the introduction of a signal to the winding in a direction for increasing the flux and to provide a high impedance to the windings on the core upon the introduction of a signal to the winding in a direction for decreasing the flux, means for providing input signals for initially saturating the cores with fluxes of particular polarities, means including the first and second windings and the first unidirectional means connected in a circuit to receive clock signals after the introduction of the input signals for the production of a high impedance or a low impedance in the second winding in accordance with the prior introduction or lack of introduction of input signals to the cores, a first controlled member including first and second saturable cores and including first and second windings disposed on the cores and connected in a relationship corresponding to that recited above for the first and second windings in the control member, a second controlled member including first and second saturable cores and including first and second windings disposed on the cores and connected in a relationship corresponding to that above recited for the first and second windings in the control member, second unidirectional means, third unidirectional means, and circuitry including a first branch formed by the second unidirectional means, the second winding on the first controlled member and the second winding on the control member and including a second branch formed by the third unidirectional means, the second winding on the second controlled member and the second winding on the control member for introducing clock signals to the circuitry to produce signals upon the occurrence of a high impedance in the second winding on the control member or upon the occurrence of a low impedance in the second winding on the control member and the simultaneous occurrence of a high impedance in at least one of the second windings on the controlled members.

3. In combination, a control member having first and second cores each saturable with fluxes of opposite polarities, first unidirectional means, first and second windings disposed on the cores and connected in a series relationship to introduce signals to the windings for controlling the polarities of the saturable fluxes in the cores and the impedances in the windings, third and fourth windings disposed on the cores, the fourth winding being provided with first and second terminals, the fourth winding being grounded at the first terminal and being connected at the second terminal in a series circuit with the third winding and with the first unidirectional means to provide for the introduction of clock signals to the windings to obtain the production of a high or low impedance in the fourth winding in accordance with the prior introduction or lack of introduction of input pulses to the first and second windings, a first controlled member including first and second cores and including first, second, third and fourth windings disposed on the cores and connected in circuits corresponding to the circuits provided for the windings in the control member and having the fourth winding on the first controlled member connected to the second terminal of the fourth winding on the control member, a second controlled member including first and second cores and including first, second, third and fourth windings disposed on the cores and connected in circuits corresponding to the circuits provided for the windings in the control member and having the fourth winding in the second controlled member connected to the second terminal of the fourth winding on the control member, first impedance means, second impedance means, second unidirectional means, third unidirectional means, a first series circuit including the first impedance means, the second unidirectional means, the fourth winding on the first controlled member and the fourth winding on the control member for providing for the introduction of clock signals to the circuit for the production of signals in the first impedance means upon the occurrence of a high impedance in either or both of the windings in the circuit, and a second series circuit including the second impedance means, the third unidirectional means, the fourth winding on the second controlled member and the fourth winding on the control member for providing for the introduction of clock signals to the circuit for the production of signals in the second impedance means upon the occurrence of a high impedance in either or both of the windings in the circuit.

4. In combination, a control member including first and second cores each saturable with fluxes of opposite polarities, first and second windings disposed on the first and second cores, first unidirectional means, means for providing input signals to saturate the cores magnetically in opposite directions for a low impedance in one of the windings and a high impedance in the other winding, means for providing for the introduction of clock signals to the windings after the input signals to saturate the cores magnetically in the same direction, a first terminal connected to the second winding, a circuit including the first unidirectional means and the first and second windings and the first terminal for providing a high impedance at the first terminal in accordance with the impedances resulting in the first and second windings from the introduction or lack of introduction of the input pulses, a first controlled member including first and second cores and including first and second windings disposed on the cores and connected in a circuit corresponding to that recited above for the first and second windings on the control member connected to the second winding in the first controlled member, this circuit including a second terminal, a second controlled member including first and second cores and including first and second windings disposed on the core and connected in a circuit corresponding to that recited above for the first and second windings on the control member, this circuit including a third terminal connected to the second winding in the second controlled member, means including second unidirectional means connected in a circuit with the first and second terminals and with the second windings on the control member and on the first controlled member for receiving clock signals to produce output signals upon the occurrence of a high impedance in at least one of the windings in the circuit, and means including third unidirectional means connected in a circuit with the first and third terminals and with the second windings on the control member and on the second controlled member for receiving clock signals to produce output signals upon the occurrence of a high impedance in at least one of the windings in the circuit.

5. In combination, a control member having first and second cores each saturable with fluxes of first and second polarities to present a high impedance or a low impedance to windings disposed in magnetic proximity to the cores, first and second windings respectively coupled magnetically to the first and second cores and connected in a circuit to introduce input pulses to the windings for the saturation of the cores with fluxes of the first polarities before the introduction of the pulses and for the saturation of the cores with fluxes of the second polarities upon the introduction of the pulses, first unidirectional means, third and fourth windings respectively coupled magnetically to the first and second cores and connected in a circuit with the unidirectional means to introduce clock signals to the windings for the production of a high impedance in the fourth winding and simultaneously a low impedance in the third winding or to produce a high impedance in the third winding and simultaneously a low impedance in the fourth winding in accordance with the prior introduction or prior lack of introduction of input pulses to the first and second windings, a first controlled member having first and second cores and first, second, third and fourth windings connected in a relationship corresponding to that recited above for the control member, a second controlled member having first and second cores and first, second, third and fourth windings connected in a relationship corresponding to that recited above for the control member, and electrical circuitry including unidirectional means and the fourth windings in the control member and in the first and second controlled members for providing a signal upon the introduction of clock signals to the circuitry and upon the occurrence of a high impedance in the fourth winding of the control member or upon the occurrence of a high impedance in at least one of the fourth windings in the controlled members at the time of occurrence of a low impedance in the fourth winding in the control member.

6. In combination, a control member including first and second cores each saturable with fluxes of opposite polarities, a first pair of windings disposed on the first and second cores and connected in a circuit to receive input pulses for the production of saturating fluxes of particular polarities in the cores, first unidirectional means, a second pair of windings disposed on the first and second cores and connected in a circuit with the first unidirectional means to provide a high or low impedance in a particular one of the windings in the pair in accordance with the introduction or lack of introduction of input pulses to the first pair of windings, a first controlled member having first and second saturable cores and having first and second pairs of windings disposed on the cores and connected in a circuit corresponding to that recited for the first and second pairs of windings in the control member, a second controlled member having first and second pairs of windings disposed on the cores and connected in a circuit corresponding to that recited for the first and second pairs of windings in the control member, and circuitry including the particular winding in the second pair in the control member and including particular ones of the windings in the second pairs in the first and second controlled members for producing signals only upon the occurrence of a particular state of operation of the control member or otherwise upon the occurrence of the particular state of operation of at least one of the controlled members.

7. In combination, a control member including first and second cores each saturable with fluxes of opposite polarities, first and second windings disposed on the first and second cores, first unidirectional means, means for providing input signals to saturate the cores magnetically in opposite directions for a low impedance in one of the windings and a high impedance in the other winding, means for providing for the introduction of clock signals to the windings after the introduction of the input signals to saturate both of the cores magnetically in the same direction, the second winding being provided with first and second terminals and connected at the first terminal to ground, the first and second windings and the unidirectional means being connected in a series circuit and the second winding being connected in the series circuit at the second terminal to produce either a high or low impedance in the second winding upon the introduction of the clock signals and in accordance with the prior introduction or lack of introduction of input signals, a first controlled member including first and second saturable cores and including first and second windings disposed on the cores and connected in a circuit corresponding to the circuit for the first and second windings in the control member and having the second winding on the first controlled member connected to the second terminal of the second winding in the control member, a second controlled member including first and second saturable cores and including windings disposed on the cores and connected in a circuit corresponding to the circuit for the first and second windings in the control member and having the second winding on the second controlled member connected to the second terminal of the second winding in the control member, a first series circuit including a first impedance means, second unidirectional means and the second windings on the control member and on the first controlled member for providing for the reception of clock signals to produce signals in the impedance means upon the occurrence of a high impedance in at least one of the windings in the circuit, and a second series circuit including a second impedance means, third unidirectional means and the second windings on the control member and on the second controlled member for providing for the reception of clock signals to produce signals upon the occurrence of a high impedance means upon the occurrence of a high impedance in at least one of the windings in the circuit.

8. The combination recited in claim 2 in which output signals are produced in the first and second branches upon the occurrence of a high impedance in the second winding in the control member at the time of the introduction of the clock signals and in which signals are produced only in the first branch upon the simultaneous occurrence of a low impedance in the second winding in the control member and of a high impedance in the second winding in the first controlled member at the time of the introduction of the clock signals and in which signals are produced only in the second branch upon the simultaneous occurrence of a low impedance in the second winding in the control member and of a high impedance in the second winding in the second controlled member at the time of the introduction of the clock pulses.

References Cited in the file of this patent

UNITED STATES PATENTS

| | | |
|---|---|---|
| 2,021,099 | Fitz Gerald | Nov. 12, 1935 |
| 2,129,920 | Fitz Gerald | Sept. 13, 1938 |
| 2,719,962 | Karnaugh | Oct. 4, 1955 |
| 2,733,424 | Chen | Jan. 31, 1956 |